Sept. 5, 1944.  W. K. ROBBINS  2,357,768
CHAIN REPAIR LINK
Filed Nov. 14, 1941
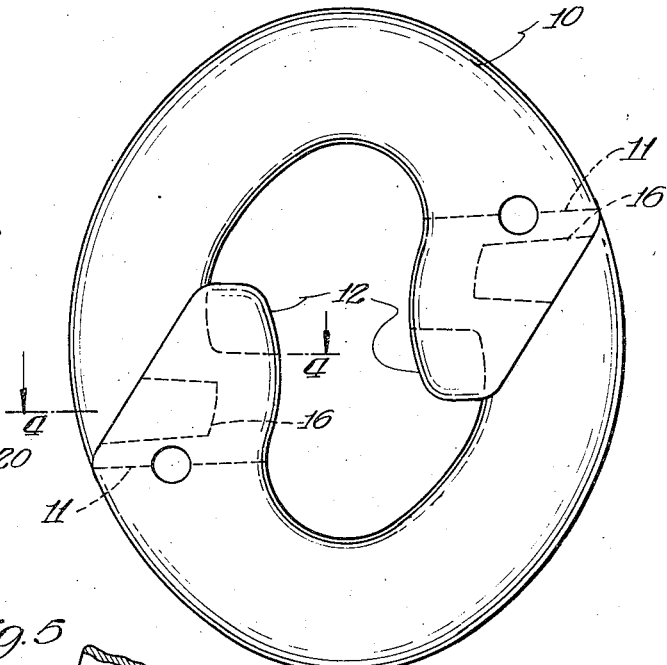
Fig. 1
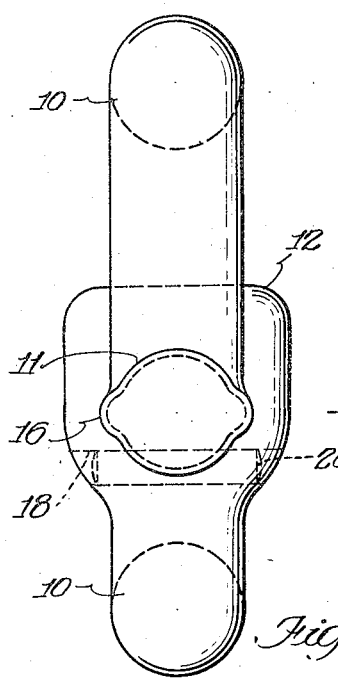
Fig. 2
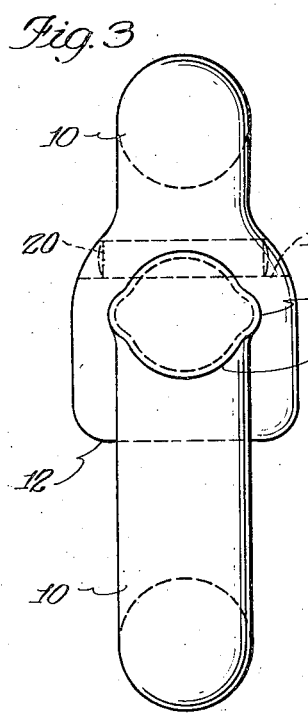
Fig. 3
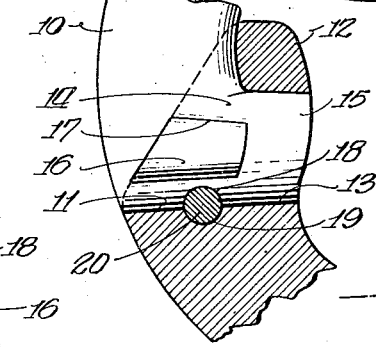
Fig. 5
Fig. 4
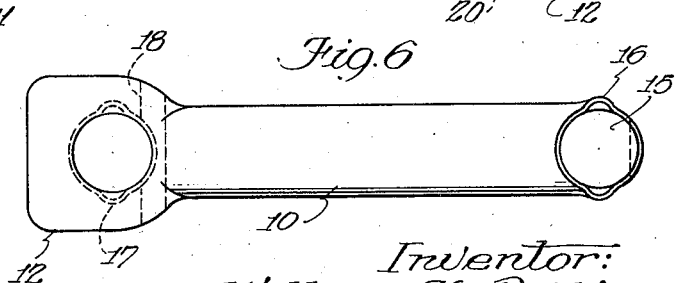
Fig. 6
Inventor:
William K. Robbins
By: Brayton Richards
Attorney.

Patented Sept. 5, 1944

2,357,768

UNITED STATES PATENT OFFICE 2,357,768

CHAIN REPAIR LINK

William K. Robbins, Chicago, Ill.

Application November 14, 1941, Serial No. 419,106

4 Claims. (Cl. 59—85)

The invention relates to improvements in chain repair links and methods of making the same and has for its primary object the provision of an improved link of the character indicated and method of making the same, whereby such links may be provided which are capable of economical production and highly efficient in use.

Another object of the invention is the provision of an improved link for repairs which may be largely produced by forging operations.

Other objects will appear hereinafter.

The invention consists of the combinations and arrangements of parts hereinafter described and claimed.

The invention will be best understood by reference to the accompanying drawing forming part of this specification and in which—

Fig. 1 is a side view of a repair link embodying the invention;

Fig. 2, an edge view thereof;

Fig. 3, a view of the opposite edge thereof;

Fig. 4, a section taken substantially on line 4—4 of Fig. 1;

Fig. 5, a section taken substantially on line 5—5 of Fig. 4; and

Fig. 6, a side view of one of the link halves as forged in straight rod form.

The embodiment of the invention illustrated in the drawing comprises a repair link made in two substantially identical U-shaped halves 10, as shown. Each link half has a socket 11 formed in one of its ends opening in the outer edge thereof, the extreme tips of the side walls of said socket being connected by a bridge 12, there being an extension of said socket extending under said bridge at 13. The other end of each link half is shaped to form a head 14 fitting said socket and provided with an extension 15 fitting and interlocking with the socket extension 13 under the bridge 12, as shown. The head 14 is also provided on its sides with tapered ribs 16 fitting and interlocking with corresponding slots or grooves 17 in the sides of the socket. Each head 14 is provided at its extreme tip with a transverse groove 18 and each socket with a registering transverse perforation 19 to receive a locking pin 20 driven therein as shown said groove and the outer portion of said perforation being located on opposite sides of the line of separation between the head and socket.

By this arrangement a repair link is provided, the interlocking parts of which may be readily constructed largely by forging operations and which may be readily fitted together in interlocking engagement when desired. The interlocking joints between the link halves are such that they may readily be made of the same strength as the bodies thereof and the pins 20 merely serve to hold the joints from lateral displacement and thus are not subjected to any operative strains. The taper of the socket and head causes wedging or tightening of the parts when fitted together notwithstanding slight variations in size and the groove 18 and perforation 19 may be formed after assembly of the parts so that a perfect fit may always be obtained. As will be noted the tapering of the head 14 and socket 11 facilitates the assembly of the parts without reducing the effective strength thereof. The specific form and arrangement of the parts constitutes a simple and efficient construction for the purpose.

While I have illustrated and described the preferred form of construction for carrying the invention into effect, this is capable of variation and modification without departing from the spirit of the invention. I therefore do not wish to be limited to the precise details disclosed, but desire to avail myself of such modifications and variations as fall within the scope of the appended claims.

I claim:

1. A chain repair link comprising two link halves each having a transverse socket formed in one of its ends opening in an edge thereof and arranged at substantially right angles to the line of strain on said link, the other end of said link half being shaped to form a head fitting and interlocking with the socket in the other link half, there being a transverse groove in an edge of the head extending across said edge at substantially right angles thereto and a registering transverse perforation in the sides of the socket, said groove and the outer portion of said perforation being located on opposite sides of the line of separation between the head and socket to form a transverse securing hole extending at substantially right angles to said line of separation.

2. The link specified in claim 1 in which the socket and head are tapered.

3. A chain repair link comprising two substantially U-shaped link sections each having one end portion provided with a transverse socket defined in part by an inwardly offset end bridge wall portion of the link section and the socket having a common opening through the outer side and end of the section to said bridge wall, the other end of each link section having a transversely extending head inwardly offset to engage under the bridge wall of the other link section, and transversely extending interengaging means on the socket and head of each link section outwardly of said bridge wall whereby maximum strength with uninterrupted peripheral contour at the joint is provided, the interengaging means being on diametrically opposite sides of the socket and head and comprising interfitting ribs and grooves.

4. A chain repair link comprising two substantially U-shaped link sections each having one end portion provided with a transverse socket defined in part by an inwardly offset end bridge wall portion of the link section and the socket having a common opening through the outer side and end of the section to said bridge wall, the other end of each link section having a transversely extending head inwardly offset to engage under the bridge wall of the outer link section, and transversely extending interengaging means on the socket and head of each link section outwardly of said bridge wall whereby maximum strength with uninterrupted peripheral contour at the joint is provided, and the socket and head being uniformly tapered toward the inner ends thereof.

WILLIAM K. ROBBINS.